Patented Apr. 21, 1925.

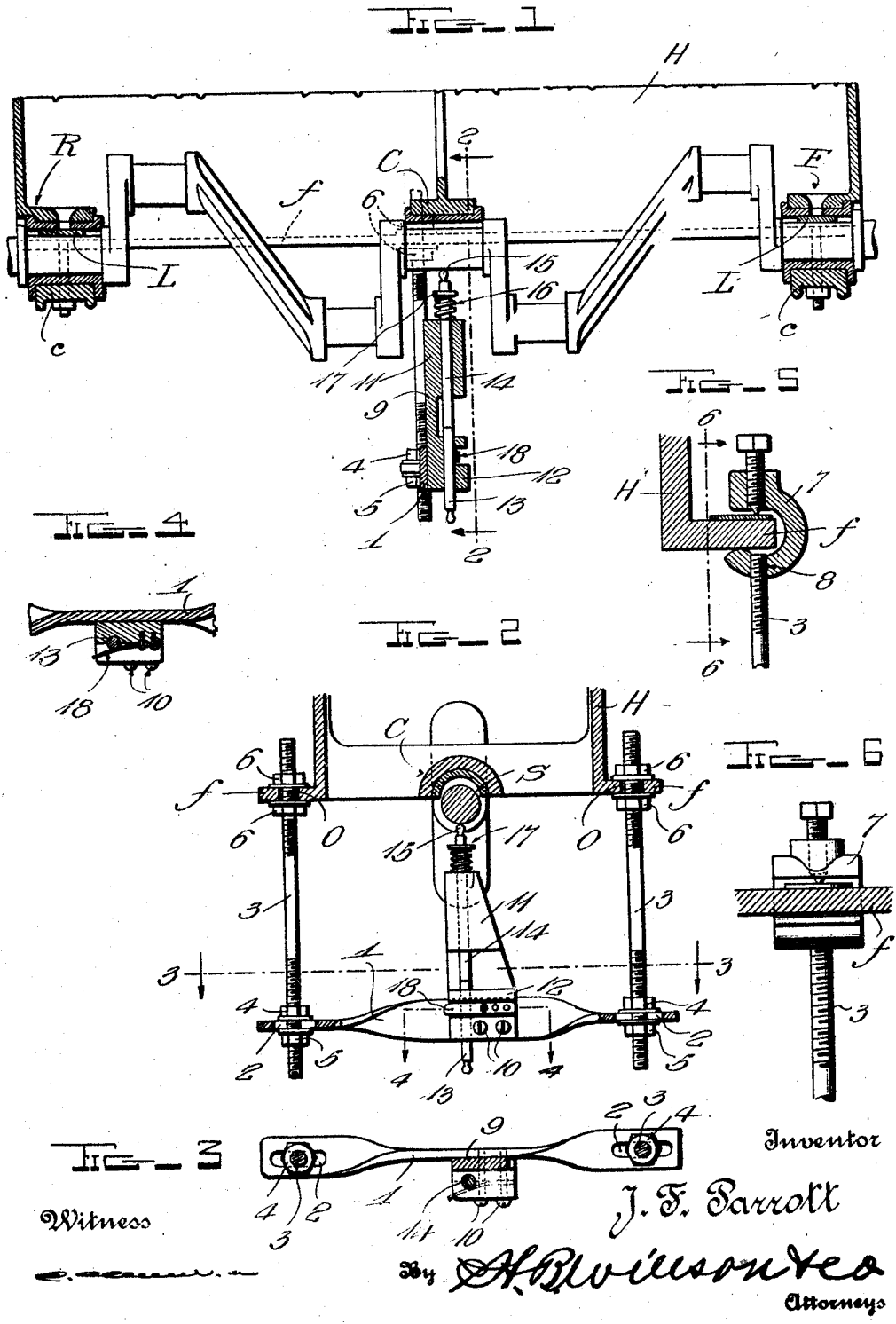

1,534,408

UNITED STATES PATENT OFFICE.

JOHN F. PARROTT, OF EAST MOLINE, ILLINOIS.

CRANK-SHAFT TESTER.

Application filed February 1, 1924. Serial No. 690,026.

*To all whom it may concern:*

Be it known that I, JOHN F. PARROTT, a citizen of the United States, residing at East Moline, in the county of Rock Island and State of Illinois, have invented certain new and useful Improvements in Crank-Shaft Testers; and I do declare the following to be a full, clear, and exact description of the invention, such as will enable others skilled in the art to which it appertains to make and use the same.

My invention relates to improvements in devices for testing the crank shafts of engines, to determine whether the main bearing portions thereof are in true axial alinement.

One object of the invention is to provide a device of the class set forth which may be conveniently used without removing the crank shaft from the motor and which does not necessitate that the motor be removed from the machine, if its main bearings are accessible without such removal.

Another object of the invention is to provide unique indicating means, permitting a measurement to be accurately made of the distance which the main bearing portions of the shaft may be out of alinement.

Yet another object is to provide a device which is simple and inexpensive, yet is highly efficient and convenient, and may be easily used upon numerous types of motors.

A further object is to provide a new and improved method for testing a crank shaft without removing it from the motor, and while the improved testing device is preferably used in performing the test, this is not essential, as in some instances, the whip can be determined by the naked eye or with other instruments.

With the foregoing in view, the invention resides in the novel subject matter hereinafter described and claimed, the description being supplemented by the accompanying drawing.

Figure 1 is a longitudinal sectional view showing the application of my invention.

Figure 2 is a vertical transverse sectional view as indicated by line 2—2 of Fig. 1.

Figure 3 is a horizontal sectional view on line 3—3 of Fig. 2.

Figure 4 is a detail horizontal section as indicated by line 4—4 of Fig. 2.

Figure 5 is a detail sectional view showing a different manner of connecting the support of the indicating means, with the crank case of a motor.

Figure 6 is a vertical sectional view on line 6—6 of Fig. 5.

I have illustrated my invention in connection with a portion of an internal combustion motor whose crank shaft S has three main bearing portions mounted in front, rear and center bearings F, R and C respectively, said bearings being carried by the upper half H of the crank case and being provided with the usual removable caps $c$. The crank case half H is provided with the usual outstanding flanges $f$ by means of which the lower crank case half is secured in place and said flanges are formed with bolt-receiving openings O in the usual manner. In some instances, the openings O are instrumental in attaching the invention to the crank case, whereas in other instances, it is necessary to employ clamps to engage the flanges $f$, as will be hereinafter fully described.

In preparing to test a crank shaft, the front and rear main bearing caps are removed and any intermediate bearing caps are loosened, so that pieces of leather L or other desired material may be disposed in the upper portions of the front and rear bearings. The caps of these front and rear bearings are then reapplied and all intermediate caps are removed, and it will be seen that the pieces of leather or the like L space the intermediate bearing portions of the shaft downwardly from the upper sides of their respective bearings, so as to permit the shaft to whip, within such bearings, if sprung. As soon as the weight of the shaft is supported by reapplication of the caps of the main front and rear bearings, the caps of the intermediate bearings may be entirely removed.

After performing the steps above described, the shaft is rotated and in some instances the whip can be seen with the naked eye at the intermediate bearing or bearings. If the extent of whip is to be measured accurately, the improved testing device is used.

The supporting means shown for the indicator, preferably comprising a horizontal bar 1 having longitudinal slots 2 in its ends through which spaced, vertical, attaching arms 3 pass, said arms being provided with upper and lower nuts 4 and 5 or other shoulders or collars, to engage the upper and lower sides of the bar 1 and hold the arms and bar relatively, after making any adjustments which may be necessary. If the openings O happen to be properly positioned, the upper ends of the arms 3 may be passed through them as shown in Fig. 2, and nuts 6 used to secure said arms to the flanges *f*. However, if the openings O are not properly positioned, C-clamps such as that illustrated at 7 in Figs. 5 and 6, may be attached to the upper ends of the arms 3, and clamped to the flanges *f*, to attach said arms to said flanges. The lower portion of each clamp 7 is preferably formed with an opening 8 into which the upper end of the proper arm 3 may be threaded, to connect said arm and clamp.

I have illustrated a standard 9 secured by screws or the like 10 to the bar 1, said standard having an upper vertical bearing 11 and a lower similar bearing 12. Within the bearing 12, I have illustrated a slidable indicating rod 13 and an operating rod 14 for said indicating rod is slidably mounted in the bearing 11, said rod 14 having its upper end 15 in the nature of a shoe to engage an intermediate main bearing portion of the crank shaft S as shown clearly in Figs. 1 and 2. To exert a constant stress on the rod 14, away from the rod 13, and thereby hold said first-named rod in engagement with the crank shaft bearing portion, I have illustrated a coiled compression spring 16 surrounding said rod 14 and acting against a collar 17 thereon, said spring re-acting against the upper end of the bearing 11. It will thus be seen that if any whip exists in the shaft, the rod 14 will be alternately depressed by the shaft and raised by the spring. I make use of the downward movement of said rod to similarly move the rod 13 and I provide means such as the friction brake spring 18, to hold said rod 13 in any position to which it is moved. Thus, it will be seen that by turning the shaft until the rod 14 depresses to the maximum and then further turning said shaft until the upward movement of the rod 14, under the influence of the spring 16, has ceased, a space will remain between the adjacent ends of the two rods 13 and 14. This space may be accurately measured with a thickness gauge or the like and will show the amount which the shaft is out of line.

The operations above described are followed when the shaft is being tested without removing the engine from the machine.

Substantially the same operations are used when the motor must be removed, but for sake of convenience, all parts are then preferably used in inverted positions, as the motor will preferably rest in such position on a suitable bench or work support.

Excellent results are obtainable from the details disclosed and they may therefore be followed if desired, but within the scope of the invention as claimed, numerous changes may be made.

I claim:

1. A crank shaft tester comprising a support to extend under a motor when the lower half of the crank case is removed, said support having attaching means for engagement with the usual flanges of the upper crank case half, and indicating means carried by said support and provided with a shoe to contact with an intermediate main bearing portion of the crank shaft.

2. A crank shaft tester comprising a support to extend under a motor when the lower half of the crank case is removed, said support having upstanding attaching arms adapted for passage through certain openings of the usual flanges on the upper crank case half, and indicating means carried by said support and provided with a shoe to contact with an intermediate main bearing portion of the crank shaft.

3. A structure as specified in claim 2; together with clamps applicable to said arms and engageable with the crank case flanges.

4. A crank shaft tester comprising a support to extend under a motor when the lower half of the crank case is removed, said support having upstanding attaching arms provided with clamps to engage the usual flanges on the upper crank case half to secure said support in place, and indicating means carried by said support and provided with a shoe to contact with an intermediate main bearing portion of the crank shaft.

5. A crank shaft tester comprising a support to extend under a motor when the lower half of the crank case is removed, said support having horizontally and vertically adjustable attaching means for engagement with the usual flanges on the upper half of the crank case, and indicating means carried by said support and provided with a shoe to contact with an intermediate main bearing portion of the crank shaft.

6. A crank shaft tester comprising a support to extend under a motor when the lower half of the crank case is removed, said support having horizontal slots spaced apart in the direction of their lengths, a pair of upstanding arms engaged with said slots for horizontal adjustment, means for relatively securing said support and arms, means for connecting the upper ends of said arms with the upper half of the crank case, and indicating means carried by said support and provided with a shoe to contact with an intermediate main bearing portion of the crank shaft.

7. A crank shaft tester comprising a bar adapted to extend horizontally under a motor when the lower half of the crank case is removed, the ends of said bar having longitudinal slots, spaced vertical attaching arms having their lower ends passed through said slots and provided with shoulders resting on said bar, clamping nuts threaded on said arms and abutting the lower side of said bar, means for connecting the upper ends of said arms with the upper half of the crank case, and indicating means mounted on said bar for engagement with a bearing portion of the crank shaft.

8. A crank shaft tester comprising an indicator and a support upon which it is movably mounted, an operating member mounted movably on said support and adapted to strike and move said indicator, and means exerting a constant stress on said operating member away from said indicator, provision being made for holding said indicator in any extreme position to which it is moved by said operating member.

9. A crank shaft tester comprising a support having a bearing, an indicator slidably received in said bearing and adapted to be slid by a sprung crank shaft, and a spring arm contacting with said indicator and carried by said bearing, said arm being adapted to hold the indicator in the position to which it is moved.

10. A crank shaft tester comprising a support having a bearing, an indicator slidable in said bearing, an operating member mounted movably on said support and adapted to strike and slide said indicator when moved by a sprung crank shaft, means exerting a constant stress on said operating member away from said indicator, and a brake acting on said indicator for holding it in the position to which it is moved by said operating member.

11. A crank shaft tester comprising a support having a pair of spaced bearings in substantially axial alinement, an indicating rod slidably received in one of said bearings, a crank shaft engaging rod slidably received in the other bearing and adapted to strike and operate said indicating rod, means exerting a constant stress on said crank shaft engaging rod away from said indicating rod, and means for holding said indicating rod in the position to which it is moved by the first named rod.

12. The method of testing a motor crank shaft while supported in the crank shaft casing, said casing having upper front, rear and intermediate bearings provided with removable bearing caps, and which consists in removing the front and rear shaft bearing caps and loosening the intermediate bearing cap or caps, inserting spacers between the shaft and the upper halves of the front and rear bearings, re-applying the caps of the front and rear bearings, removing the intermediate bearing cap or caps, and rotating the shaft, whereby the whip may be viewed or measured at the intermediate bearing or bearings.

In testimony whereof I have hereunto set my hand.

JOHN F. PARROTT.